Patented Aug. 10, 1943

2,326,157

UNITED STATES PATENT OFFICE 2,326,157

ACTIVATED ANHYDRITE, PROCESS OF MAKING THE SAME, AND PRODUCT INCLUDING IT

Andrew T. McCord, Collingswood, and Harold F. Saunders, Haddonfield, N. J., assignors to The Sherwin-Williams Company, Cleveland, Ohio, a company of Ohio No Drawing. Application December 17, 1940, Serial No. 370,486

15 Claims. (Cl. 106—306)

A crystalline form of calcium sulphate known as anhydrite occurs in nature, and various methods have been proposed for artificially preparing calcium sulphate with this crystalline form. One such method involves the treatment of calcium oxide, calcium hydrate, calcium carbonate, or other analogous calcium compound with relatively concentrated sulphuric acid under carefully controlled conditions, as disclosed by Washburn and Kingsbury in Patent 2,222,385.

The main object of the present invention is to produce a new calcium sulphate product having superior properties, for various uses including extender pigments in paints, fillers in paper, textiles and rubber, and for various other purposes. Our new product is characterized by its extreme whiteness of color, very soft texture, ease of mixing and dispersion in vehicles, definite improvement in chalk and fading resisting properties, improved light resisting properties, and requiring a shorter grinding time to reduce to the desired state of fineness.

We have discovered that if the anhydrite form of calcium sulphate be produced by the action of strong sulphuric acid on a calcium compound which may be converted into the sulphate by sulphuric acid in the presence of a relatively small amount of a titanium compound, the superior and desirable properties of the calcium sulphate in the anhydrite form are obtained. The exact nature of the change which is effected, or the different structural or physical form of the produced calcium sulphate is not definitely known, but the presence or action of the titanium compound during the formation of the calcium sulphate, greatly improves the properties of the calcium sulphate, and may be considered as activating it. Therefore, we will hereinafter refer to the new product as activated calcium sulphate. The acid should be sufficiently strong to insure the production of the anhydrite rather than the gypsum form of calcium sulphate, as disclosed in the Washburn and Aagaard Patents 1,906,729 and 1,906,730. See also the Sullivan Patent 2,151,339.

No one particular form of titanium compound is necessary for the production of the activated product. Certain of the various ways in which the product may be made will be clear from the following examples.

Essentially they involve the effecting of the reaction of calcium oxide or other suitable calcium compound with sulphuric acid in the presence of certain titanium compounds added to the sulphuric acid prior to its mixture with the calcium oxide or the like, so that it is present during the formation of the calcium sulphate, and so that said calcium sulphate will be of the anhydrite type. Instead of using calcium oxide (lime), we may use the hydroxide, carbonate or any other calcium compound which will be readily converted into the sulphate and which will not produce objectionable compounds in the reaction.

EXAMPLE 1

We may use hydrous titanium oxide, showing upon X-ray analysis the band diffraction pattern of $\gamma$-titanic acid or hydrous titanium oxide. This pattern, as defined in application Ser. No. 356,646 is substantially as follows:

| d/n | Intensity |
|---|---|
| 5.83 | 5 |
| 3.99 | 10 |
| 3.40 | 6 |
| 3.145 | 2.5 |
| 2.600 | 2.5 |
| 2.342 | 3.5 |
| 2.132 | 3.5 |
| 1.888 | 8.0 |
| 1.696 | 1.5 |
| 1.499 | 9.5 |
| 1.354 | 3.0 |
| 1.247 | 2.5 |
| 1.177 | 3.5 |
| 1.087 | 2.5 |
| 1.048 | 5.0 |
| 1.011 | 1.5 |
| 0.956 | 6.0 |
| 0.917 | 0.5 |
| 0.894 | 2.0 |
| 0.868 | 4.0 |
| 0.843 | 0.5 |
| 0.813 | 3.0 |
| 0.785 | 2.0 |
| 0.747 | 3.0 |
| 0.712 | 3.5 |
| 0.692 | 1 |
| 0.682 | 2.5 |
| 0.670 | 3.5 |
| 0.656 | 1 |

This $\gamma$-titanic acid may be obtained by contacting a solution of ammonium fluotitanate with aqua ammonia, washing, separating and drying according to the process of Verduin and Todd, application Serial No. 321,974. To 421 grams of 90% sulphuric acid was added 4.2 grams (dry basis) of this form of hydrate, and to this dispersion was then slowly added with agitation a slurry of 100 grams of calcium oxide in 900 grams of water. The heat of reaction causes the mixture to boil. The resulting slurry was a sulphuric acid suspension of activated anhydrite, containing a small amount of titanium compound.

As will later be pointed out, this slurry itself may be used as a nucleating agent for ilmenite solutions, but for other purposes the activated anhydrite was separated from the residual acid, washed with water to a pH of 6 and dried at 110° C. This product may be used commercially as hereinafter pointed out, but for other uses the sample of the wet cake prepared as above described, and after washing out the acid, was calcined for four hours at 975° C. The high temperature did not adversely affect either the color or texture, whereas by carrying out the same procedure and with the materials in the same proportion and concentration but without the addition of the titanium compound, a calcining at 950° resulted in a poorer color and a deterioration of texture by becoming harder and more sintered.

One advantage accruing from this property of the activated calcium sulphate to withstand calcination at higher temperatures is the ability to obtain an anhydrite which is substantially insoluble in water and exhibits no tendency to form hydrated compounds in contact with water while still retaining the excellent color and brightness characteristics that are ordinarily lost or depreciated when the usual unactivated calcium sulphate is calcined at sufficiently high temperatures to confer resistance to water.

Example 2

A titanium compound was prepared as follows: 100 cc. of titanium tetrachloride, $TiCl_4$ was dissolved in 200 cc. of water at 4° C. The solution contained 15% $TiO_2$. This was poured into 4 liters of 10% aqua ammonia with agitation. The precipitate was separated by filtration and washed until no odor of ammonia was detected. Upon air drying the wet cake, it was found to give a faint band diffraction pattern typical of γ-titanic acid.

Sufficient of the wet cake to contain 4.2 grams of $TiO_2$ was added to 421 grams of 90% sulphuric acid, and the same amount of calcium oxide in the same slurry was added, as in Example 1, and the same product was obtained.

Example 3

A titanium compound was prepared as follows: 90 grams of a nitric acid solution of titanium containing 5% $TiO_2$ and 16% $HNO_3$ was poured slowly with good agitation into one liter of 10% aqua ammonia. The precipitate was separated and washed free from odor of ammonia. The moist cake contained about 9% $TiO_2$ and X-ray analysis of the air dried cake gave a band pattern typical of γ-titanic acid as above identified. Sufficient of the wet cake to contain 4.2 grams of $TiO_2$ was added to 400 grams of 96% sulphuric acid and the mixture used for reaction with calcium oxide in the same manner as in Example 1, and substantially the same product of activated calcium sulphate was obtained.

Example 4

A titanium compound was prepared as follows: 100 grams of titanium sulphate solution analyzing 10.1% $TiO_2$ and 10.5% $H_2SO_4$ was poured into one liter of 10% aqua ammonia. The precipitate was separated and washed and the wet cake contained approximately 15% $TiO_2$. An air dried sample showed the band pattern typical of γ-titanic acid. Sufficient of the wet cake to contain 4.2 grams of $TiO_2$ was added to 421 grams of 90% sulphuric acid and calcium oxide was added as in Example 1, and substantially the same results were obtained.

In the foregoing examples, the amount of γ-titanic acid used was slightly less than 2%, based upon the amount of calcium sulphate produced. The amount of γ-titanic acid is not particularly critical, as good results have been obtained with as little as 0.3%, and no disadvantages have resulted from using an excess of the γ-titanic acid.

From the foregoing examples, it will be apparent that the particular procedure employed in making the γ-titanic acid is not important, and that γ-titanic acid from any source may be added to the sulphuric acid before the lime is added and will constitute a definite activating agent for the calcium sulphate. Any titanium hydrate obtained by ammonia precipitation from a titanium bearing solution may be used for the activation.

The titanium compound used for producing the activated calcium sulphate need not be of the γ-titanic acid form. It may be of the anatase crystalline structure.

Example 5

500 grams of γ-titanic acid cake containing 20% $TiO_2$ and obtained according to the procedure of the Verduin and Todd App'n. 321,974 was slurried to 1,000 grams with water, and the suspension boiled for 12 hours. X-ray examination of a dried sample at this point showed conversion to the anatase crystalline structure. The slurry was dewatered to 25% $TiO_2$ and the cake then weighed 400 grams. 100 grams of this cake was mixed with 63 grams of 96% sulphuric acid and heated until a clear viscous mass resulted. A portion of this material equivalent to 4.2 grams of $TiO_2$ was added to 421 grams of 90% sulphuric acid, and this was reacted with a 10% CaO slurry, as in Example 1. The product obtained was a suspension of activated anhydrite in sulphuric acid, and this anhydrite, upon washing and drying with and without calcination, as in Example 1, gave substantially the same highly desirable products as in that example. γ-titanic acid obtained according to the procedures set forth in Examples 2, 3 and 4 were substituted for γ-titanic acid from fluoride produced as in Example 5, and equivalent results were obtained.

Example 6

100 grams of dried γ-titanic acid obtained by the fluoride or other process and containing 75 grams of $TiO_2$ were heated to 70° C. with 90 grams of sulphuric acid and 275 grams of water. The product was filtered and heated to a boil for one hour. The precipitate was separated and washed until the filtrate was substantially free from sulphuric acid. A sample of this cake, upon air drying, gave upon X-ray analysis, the definite pattern of anatase. The moist cake was slurried in 190 grams of 96% sulphuric acid and heated until a clear viscous mass resulted. Sufficient of this mass to contain 4.2 grams of $TiO_2$ was used, as described in Example 1, and substantially the same results were obtained.

Example 7

100 grams of hydrous titanium dioxide obtained by thermal hydrolysis of ilmenite solution, according to the method described by Blumenfeld Reissue Patent 18,854 was used in a procedure paralleling that set forth in Example 6 and substantially the same results were obtained.

In carrying out our process, it is not essential that the titanium compound be in the form of oxide or sulphate. Titanous solutions were prepared by each of the following procedures:

(a) 100 grams of fluoride hydrate, made according to the Verduin and Todd process and containing 75% $TiO_2$ was dispersed in 150 grams of 90% sulphuric acid and 275 grams of water. Sufficient zinc in the form of zinc dust was added to reduce substantially all of the titanium to the form of $Ti_2(SO_4)_3$. The γ-titanic acid of any origin could replace the fluoride hydrate.

(b) Thermally hydrolyzed sulphate hydrate obtained from ilmenite solution according to the Blumenfeld process of Reissue Patent 18,854 was mixed with 96 grams of 90% sulphuric acid and heated until a thick viscous mass was obtained. This mass was cooled and diluted with an equal volume of water added slowly. Sufficient zinc in the form of zinc dust was added, or the solution was passed through a body of zinc granules, as for instance in a Jones reductor, until substantially all of the titanium was reduced to the titanous form.

(c) 100 grams of titanyl sulphate were dissolved in an equal weight of water, and the solution reduced with zinc until substantially all of the titanium was in titanous form.

Example 8

A quantity of titanous sulphate solution, as prepared in any one of the ways above described under (a), (b) and (c), or in any other suitable manner, and equivalent to one gram of $TiO_2$ was added to 421 grams of 90% sulphuric acid, and into this was added gradually, with agitation, a slurry of 100 grams of CaO in 900 grams of water. Heat developed during the mixing with some loss of water. The resulting slurry was a suspension of anhydrite in a sulphuric acid solution, and from this was obtained the dried activated anhydrite and the calcined activated anhydrite, as set forth in Example 1, and having substantially the same desirable properties as those obtained by Example 1.

Example 9

Any of the titanous forms above described under (a), (b) and (c) may be poured into sufficient 10% aqua ammonia to precipitate substantially all of the titanium in the form of $$Ti_2O_3 \cdot xH_2O$$

This blue hydrous compound was filtered, washed and mixed with sufficient oxidizing agent such as hydrogen peroxide, ammonium persulphate, etc. to convert it to a hydrous titanium oxide which is the γ-titanic acid type. This γ-titanic acid may be used similarly to that obtained from other sources, as previously described.

In carrying out our invention, the activated calcium sulphate may be obtained in various different forms. It may be a suspension in sulphuric acid which may be used for the nucleation of an ilmenite solution for the production therefrom by boiling of an extended $TiO_2$ pigment ($CaSO_4/TiO_2$) or straight $TiO_2$, or it may be a dry activated calcium sulphate, or it may be a dry and calcined activated calcium sulphate. The last two have value as pigmentary materials, and for use in paints or as fillers in paper, textiles, rubber and the like.

If the process is carried out primarily for the production of a dry or dry and calcined calcium sulphate, the proportion of acid used would be less than if the sulphuric acid solution is to be used for nucleating an ilmenite solution.

For making the dry product, the amount of acid used may be only such as will produce a final slurry prior to separating and drying, containing only 2% to 3% sulphuric acid. This is an obvious economy, and any additional sulphuric acid is unnecessary or wasteful.

The superiority of the activated calcined anhydrite of Example 1 over the use of unactivated calcined anhydrite is shown by the following comparison:

Separate samples of the activated and unactivated calcined anhydrite were made into a mill base by mixing the following ingredients:

| | Grams |
|---|---|
| Calcined anhydrite | 150 |
| $TiO_2$ | 65 |
| Dammar varnish | 200 |

The mixtures were ground on a three-roller paint mill. The mill base made from the unactivated calcined anhydrite required 536 seconds for grinding, while the base obtained from the activated calcined anhydrite required only 155 seconds at the same mill setting. After the grinding, the two mill bases were reduced as follows to produce paints of the fume-proof, mill-white type:

320 grams of the mill base were thoroughly mixed with 93 grams of dammar varnish and 7 grams of pine oil. The paints were applied by brushing on bonderized steel panels. The improved color and smoothness, due to the better texture of the activated calcined anhydrite over the unactivated, was very marked. Measured photometrically on a Hunter multi-purpose reflectometer, the paint film made from a sample of the unactivated anhydrite possessed a brightness of 73.8% reflectance, while the film made from the sample including the activated calcined anhydrite showed 85.7%. Corresponding differences in brightness were visually apparent in the respective paints.

We have discovered that the activated product, either in acid suspension or after drying and reslurrying in water, acid or ilmenite solution is effective as a nucleation agent for ilmenite or other sulphuric solutions of titanium to produce, upon thermal hydrolysis and calcination, a pigmentary $TiO_2$ of rutile structure.

The usual practice for the prepartion of the so-called "extender pigments" consists in using a solution of titanium sulphate in sulphuric acid, which has been obtained by the treatment of ilmenite or other titaniferous ores with sulphuric acid, and to precipitate the titanium as a hydrous titanium oxide from such solution in the presence of the extender, by boiling. The mixture of the extender and such hydrous titanium oxide, after washing, is then calcined to drive off the sulphuric radical and convert the hydrate into pigmentary titanium dioxide. In prior practice, the titanium content of such extended pigment has been in the form of anatase.

In application Serial Number 349,345, a method was disclosed wherein a slurry of an extender and a titanium hydrate in dilute sulphuric acid, was dewatered and calcined. The specific form of hydrous titanium dioxide used therein was added as the γ-titanic acid, and in the resulting extended pigment, the titanium is in the rutile modification.

We have found that when the extender, which is to be used in accordance with the prior art, where an ilmenite solution is hydrolyzed in the presence of the extender, is of the specific type herein disclosed and referred to as "activated anhydrite" or "activated calcium sulphate" and the precipitate obtained by hydrolysis of the ilmenite solution in the presence of such specific extender is separated, washed and calcined, the titanium content will be of the rutile modification. The product is of unusual whiteness, brightness and fine texture, and possesses a hiding power markedly higher than the similar products of the prior art. Such extended pigment has been made according to the following examples, using activated anhydrite prepared in any of the ways hereinbefore described, and with equivalent results. In the following examples, the activated anhydrite may be made by any of the procedures hereinbefore set forth, and therefore the following examples are not to be confined to any one of the specific methods of forming the activated anhydrite.

EXAMPLE 10.—$TiO_2$ extended pigment (70% $CaSO_4$/30% $TiO_2$)

A quantity of the sulphuric acid suspension of activated anhydrite obtained in Example 4, but preferably from Example 1, and adjusted to contain 245 grams of $CaSO_4$, 210 grams of $H_2SO_4$, and 966 grams of water was added to 1150 grams of ilmenite solution containing 8.1% $TiO_2$, 20.2% $H_2SO_4$, and 13.85% $FeSO_4$. The $H_2SO_4$ is both that which is free and that which is combined with titanium but does not include that combined with the iron. The mixture was then boiled for 3 hours by which time about 95% of the titanium was precipitated. The solids were separated and washed until substantially free from iron. The washing removes a small amount of $CaSO_4$, leaving a product which then contained approximately 70 parts $CaSO_4$ and 30 parts $TiO_2$. The cake was dewatered to about 45% solids and the moist cake calcined 2 hours at 975° C. The titanium in the product was all in the crystalline form of rutile.

The calcination above referred to was performed in the laboratory. In a rotary calciner a lower temperature of about 875–900° would be employed according to the factor of calciner operation difference. The range of calcination may be stated as 800° to 1000°.

It has been found to be advantageous to treat the moist cake prior to calcination with a compound of a metal of the second group of the periodic table as described in application Serial Number 367,390, since this treatment reduces the temperature and time required in calcination to effect proper development of crystallinity, hiding power, and other desirable pigmentary properties. An example of a procedure including such treatment is as follows:

EXAMPLE 11.—$TiO_2$ extended pigment (70% $CaSO_4$/30% $TiO_2$)

Into the moist cake in Example 10 and prior to calcination, was incorporated 0.2% of MgO based on the total solids in the form of $MgSO_4$ previously dissolved in a little water. This cake was then calcined for 2 hours at 950° C.

EXAMPLE 12.—$TiO_2$ extended pigment (30% $CaSO_4$/70% $TiO_2$)

A quantity of the sulphuric acid suspension and activated anhydrite obtained in Example 2, sufficient to contain 245 $CaSO_4$ was added to 6615 grams of ilmenite solution containing 8.1% $TiO_2$, 20.2% $H_2SO_4$, and 13.85% $FeSO_4$. The mixture was boiled 4 hours, dewatered and washed until substantially iron-free. The moist cake containing approximately 35% solids and a ratio of $CaSO_4$/$TiO_2$ of 30/70 was mixed with 0.2% ZnO based on total solids (as a solution of $ZnSO_4$) and calcined 2 hours at 950° C. The titanium content of the product is in the rutile crystalline modification.

EXAMPLE 13

The precipitate from Example 12 was washed for a sufficient time to remove substantially all of the $CaSO_4$, dewatered, and the moist cake mixed with 0.2% ZnO (based on $TiO_2$), as a solution of zinc sulphate. Calcination for 2 hours at 975° produced a pigmentary rutile practically 100% $TiO_2$.

Examples 10, 11 and 12 are typical and may be sufficient to disclose the procedure. It is to be understood that any of the activated anhydrites may be used in place of the particular one of Example 1. It is also to be understood that the example above representing 70/30 ratio $CaSO_4$/$TiO_2$ is only representative, as ratios of $TiO_2$ from 1 up to 100 are within the scope of the practice of this invention.

The following tabulation demonstrates the superiorities of our pigment:

Tinting strength determined by the A. S. T. M. procedure D–332–36

| | |
|---|---|
| 70/30 $CaSO_4$/anatase pigment by prior art (high grade commercially available pigments) | 450–470 |
| 70/30 pigment from anhydrite activated with γ-titanic acid as per Examples 10 and 11 | 610 |
| 70/30 pigment from anhydrite activated with $Ti_2(SO_4)_3$ as per Example 8 | 585 |
| 70/30 pigment from anhydrite activated with a dispersed or thermally hydrolyzed titania hydrate as per Example 6 | 585 |
| 70/30 pigment ditto from Example 7 | 595 |
| 70/30 pigment from anhydrite activated with anatase (fluoride source) Example 5 | 625 |
| 70/30 pigment from anhydrite activated with anatase (chloride source as per Example 5) | 640 |
| 70/30 pigments from various activated anhydrites | 550–640 |

Hiding power

Hiding power as square feet per pound of pigment, was determined according to A.S.T.M. Designation D 406–39, on the prior art pigments, and shows 48 sq. ft., while our products showed from 55 to 65 sq. ft.

Color

A direct visual comparison in oil shows our product to be equal or superior to the highest grades 70/30 $CaSO_4$ anatase extended pigments available and to possess a superior retention of color on exposure to atmoshpheric condition in paint film.

Because of the greater hiding power, further extension of rutile pigments in paint formulation is possible with our pigments, to obtain hiding power equal to prior art pigments. Besides economy, another advantage of this lies in ability to obtain considerably further flatting effects in flat paint formulation, since flatting is in considerable measure increased with increasing proportion of inert pigments.

It would not appear necessary to present detail paint formulations, illustrating usage of our pigment, since formulation with $CaSO_4/TiO_2$ extended pigments is common knowledge. Our products may be substituted pound for pound for prior art pigment with the improved results in hiding, color, brightness, etc., previously noted.

The extended pigment herein disclosed is claimed in applicants' copending application, Serial No. 463,081, filed October 23, 1942.

Having thus described our invention, what we claim as new and desire to secure by Letters Patent is:

1. The process of making calcium sulphate in the anhydrite form, which includes reacting a calcium compound with strong sulphuric acid, said calcium compound being selected from the group consisting of calcium compounds which may be converted into the sulphate by sulphuric acid, and said sulphuric acid containing at least 0.1% and not to exceed 5% of a titanium compound selected from the group consisting of hydrous titanium oxide and compounds of titanium which will form hydrous titanium oxide under the conditions of the reaction between said calcium compounds and said sulphuric acid.

2. The process of making calcium sulphate in the anhydrite form, which on X-ray analysis shows the crystalline structure of anhydrite, which includes reacting a calcium compound with strong sulphuric acid to which has been added 0.1% to 5% of γ-titanic acid, said calcium compound being selected from the group consisting of calcium compounds which may be converted into the sulphate by sulphuric acid.

3. The process of making calcium sulphate in the anhydrite form, which on X-ray analysis shows the crystalline structure of anhydrite, which includes reacting a calcium compound with strong sulphuric acid to which has been added 0.1% to 5% of γ-titanic acid produced by the fluoride process, said calcium compound being selected from the group consisting of calcium compounds which may be converted into the sulphate by sulphuric acid.

4. The process of making calcium sulphate in the anhydrite form, which includes adding 0.1% to 5% of a titanium hydrate to strong sulphuric acid, and thereafter adding a slurry of a calcium compound selected from the group of calcium compounds which will be converted into a sulphate by said acid, the amount of acid being at least sufficient to convert all of said calcium compound into the sulphate in the presence of the titanium compound.

5. The process of making activated calcium sulphate in the anhydrite form which includes adding 0.1% to 5% of a titanium compound selected from the group consisting of hydrous titanium oxide and compounds of titanium which will form hydrous titanium oxide under the conditions of the reaction between said celcium compound and said sulphuric acid, to strong sulphuric acid, thereafter adding a lime slurry.

6. The process of making activated calcium sulphate in the anhydrite form, which includes adding 0.1% to 5% of a γ-titanic acid to strong sulphuric acid, thereafter adding a lime slurry.

7. The process of making activated calcium sulphate in the anhydrite form which includes adding 0.1% to 5% of a titanium compound selected from the group consisting of hydrous titanium oxide and compounds of titanium which will form hydrous titanium oxide under the conditions of the reaction between said calcium compound and said sulphuric acid, to strong sulphuric acid, thereafter adding a lime slurry, the relative amounts of $H_2SO_4$ and CaO being such that all of the calcium is converted to sulphate in the presence of the titanium compound.

8. The process of making activated calcium sulphate in the anhydrite form and in suspension in sulphuric acid which includes adding 0.1% to 5% of a titanium compound selected from the group consisting of hydrous titanium oxide and compounds of titanium which will form hydrous titanium oxide under the conditions of the reaction between said calcium compound and said sulphuric acid, to strong sulphuric acid, thereafter adding a lime slurry, the relative amounts of $H_2SO_4$ and CaO being such that all of the calcium is converted to sulphate in the presence of the titanium compound.

9. The process of making activated calcium sulphate in the anhydrite form and in suspension in sulphuric acid which includes adding 0.1% to 5% of a γ-titanic acid to strong sulphuric acid, thereafter adding a lime slurry, the relative amounts of $H_2SO_4$ and CaO being such that all of the calcium is converted to sulphate in the presence of the γ-titanic acid.

10. The process of making an activated calcium sulphate in the anhydrite form, which includes adding 0.1% to 5% of a titanium compound selected from the group consisting of hydrous titanium oxide and compounds of titanium which will form hydrous titanium oxide under the conditions of the reaction between said calcium compound and said sulphuric acid, to strong sulphuric acid, adding a lime slurry, the relative amounts of $H_2SO_4$ and CaO being such that all of the calcium is converted to sulphate in the presence of the titanium compound, thereafter separating the resulting finely divided anhydrite from the mother liquor and then calcining it at a temperature of about 950°–1000° C.

11. The process of making an activated calcium sulphate in the anhydrite form, which includes adding 0.1% to 5% of a γ-titanic acid to strong sulphuric acid, adding a lime slurry, the relative amounts of $H_2SO_4$ and CaO being such that all of the calcium is converted to sulphate in the presence of the γ-titanic acid, thereafter separating the resulting finely divided anhydrite from the mother liquor and then calcining it at a temperature of about 950°–1000° C.

12. As a new product, an activated calcium sulphate which under X-ray analysis shows the crystalline structure of anhydrite, and containing 0.1% to 5% of a hydrous titanium oxide, said product being produced by the process defined in claim 1.

13. As a new product, an activated calcium sulphate which under X-ray analysis shows the crystalline structure of anhydrite, and containing 0.1% to 5% of a hydrous titanium oxide, said product being produced by the process defined in claim 8.

14. As a new product, an activated calcium sulphate, which under X-ray analysis shows the crystalline structure of anhydrite, and containing 0.1% to 5% of a hydrous titanium oxide, said product being produced by the process defined in claim 9.

15. As a new product, an activated calcium sulphate, which under X-ray analysis shows the crystalline structure of anhydrite, and containing 0.1% to 5% of a titanium oxide, said product being produced by the process defined in claim 10.

ANDREW T. McCORD.
HAROLD F. SAUNDERS.